United States Patent
Xu et al.

(10) Patent No.: US 11,238,161 B2
(45) Date of Patent: Feb. 1, 2022

(54) SECURE BOOT AND APPARATUS, AND TERMINAL DEVICE

(71) Applicant: HUAWEI TECHNOLOGIES CO., LTD., Guangdong (CN)

(72) Inventors: Shifeng Xu, Shanghai (CN); Xi Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 16/832,922

(22) Filed: Mar. 27, 2020

(65) Prior Publication Data
US 2020/0226264 A1     Jul. 16, 2020

Related U.S. Application Data

(63) Continuation of application No. PCT/CN2018/108857, filed on Sep. 29, 2018.

(30) Foreign Application Priority Data

Sep. 30, 2017   (CN) .......................... 201710928376.2

(51) Int. Cl.
    *G06F 15/177*   (2006.01)
    *G06F 21/57*    (2013.01)
    (Continued)

(52) U.S. Cl.
    CPC .......... *G06F 21/575* (2013.01); *G06F 9/4401* (2013.01); *G06F 21/44* (2013.01);
    (Continued)

(58) Field of Classification Search
    CPC ...... G06F 21/575; G06F 9/4401; G06F 21/44; G06F 21/602; G06F 21/79; G06F 21/57; G11C 11/412
    (Continued)

(56) References Cited

U.S. PATENT DOCUMENTS

| 9,575,768 B1* | 2/2017 | Kim ...................... G06F 9/4401 |
| 2008/0086629 A1* | 4/2008 | Dellow ................. G06F 21/575 |
| | | 713/2 |

(Continued)

FOREIGN PATENT DOCUMENTS

| CN | 102388365 A | 3/2012 |
| CN | 103514414 A | 1/2014 |

(Continued)

OTHER PUBLICATIONS

Extended European Search Report issued in European Application No. 18861963.9 dated Sep. 8, 2020, 6 pages.

(Continued)

*Primary Examiner* — Nolvick Derose
(74) *Attorney, Agent, or Firm* — Fish & Richardson P.C.

(57) ABSTRACT

One example method includes copying code and a security signature of a first off-chip boot to a static random access memory (SRAM) for signature verification, where a function implemented by the first off-chip boot includes initializing a double data rate synchronous dynamic random access memory (DDR), and the DDR initialization includes configuring a DDR secure zone, executing, in the SRAM, the code of the first off-chip boot after the signature verification on the first off-chip boot succeeds to initialize the DDR and configure the DDR secure zone, copying code and a security signature of a second off-chip boot to the DDR secure zone for signature verification, where the second off-chip boot is all of other boots in off-chip boots except the first off-chip boot, and executing, in the DDR secure zone, the code of the second off-chip boot after the signature verification on the second off-chip boot succeeds.

9 Claims, 4 Drawing Sheets

(51) Int. Cl.
  *G06F 9/4401* (2018.01)
  *G06F 21/44* (2013.01)
  *G06F 21/60* (2013.01)
  *G11C 11/412* (2006.01)

(52) U.S. Cl.
  CPC .......... *G06F 21/602* (2013.01); *G11C 11/412* (2013.01); *G06F 9/4406* (2013.01)

(58) Field of Classification Search
  USPC ............................................................. 713/2
  See application file for complete search history.

(56) References Cited

U.S. PATENT DOCUMENTS

| | | | |
|---|---|---|---|
| 2008/0086631 A1* | 4/2008 | Chow ..................... | G06F 8/654 713/2 |
| 2009/0064274 A1* | 3/2009 | Zimmer ................ | G06F 21/575 726/2 |
| 2009/0113196 A1 | 4/2009 | Jan et al. | |
| 2013/0166833 A1* | 6/2013 | Choi ................ | H04N 21/42692 711/104 |
| 2014/0122820 A1* | 5/2014 | Park ........................ | G06F 21/74 711/163 |
| 2014/0205092 A1* | 7/2014 | Hartley ................ | H04L 9/0897 380/44 |
| 2015/0160946 A1* | 6/2015 | Peng ......................... | G06F 8/30 713/2 |
| 2015/0161600 A1* | 6/2015 | Kahan ..................... | G06F 21/83 705/39 |
| 2015/0339195 A1* | 11/2015 | Yang ................... | G06F 11/1417 714/6.12 |
| 2016/0055069 A1* | 2/2016 | Jeansonne ............. | G06F 3/0683 714/15 |
| 2016/0055338 A1* | 2/2016 | Jeansonne ............. | G06F 3/0688 713/2 |
| 2016/0142386 A1* | 5/2016 | Snyder, II .......... | H04L 63/0884 713/171 |

FOREIGN PATENT DOCUMENTS

| | | |
|---|---|---|
| CN | 103677912 A | 3/2014 |
| CN | 103793629 A | 5/2014 |
| CN | 106934289 A | 7/2017 |

OTHER PUBLICATIONS

PCT International Search Report and Written Opinion in International Application No. PCT/CN2018/108,857, dated Jan. 7, 2019, 15 pages (With English Translation).

* cited by examiner

US 11,238,161 B2

SECURE BOOT AND APPARATUS, AND TERMINAL DEVICE

CROSS-REFERENCE TO RELATED APPLICATIONS

This application is a continuation of international Application No. PCT/CN2018/108857, filed on Sep. 29, 2018, which claims priority to Chinese Patent Application No. 201710928376.2, filed on Sep. 30, 2017, The disclosures of the aforementioned applications are hereby incorporated by reference in their entireties.

TECHNICAL FIELD

Embodiments of the present invention relate to the computer field, and in particular, to a secure boot and apparatus, and a terminal device.

BACKGROUND

System security is a set of software and hardware solutions that support a secure boot and ensure that a system is run in a trusted environment. An ARM architecture-based system security scheme is usually formed by a combination of a secure boot (Secure boot) technology and a trust zone (Trust Zone) technology. The secure boot is a basis of the system security, and is responsible for an initialization process of an entire security system. According to a trusted integrity theory, a secure boot of a system is a trusted root of security of the entire system, and security of other components of the system can be ensured only when security of the system boot is ensured.

During the secure boot of the system, the system verifies signatures level by level, and after the verification succeeds, the system guides a subsequent process. Usually, a security signature and code are stored in an off-chip (which is usually a flash memory FLASH). The system is first started by an on-chip boot. After signature verification on off-chip boot code succeeds, the system is switched to the off-chip boot code for execution, to guide a subsequent boot program. FIG. 1 is a schematic diagram of a secure boot process in the prior art. As shown in FIG. 1, an on-chip boot and a static random access memory (Static Random Access Memory, SRAM) are secure zones. After being powered on, a system first runs secure boot code (Boot ROM Secure boot Code, BSBC) in the on-chip boot, and after completing necessary initialization configuration, the system copies an off-chip boot at the next level to the SRAM for signature verification. Because the SRAM has relatively high costs, usually, a size of the SRAM does not exceed 256 KB and is far smaller than a size of the off-chip boot, the copy and signature verification actions can only use a manner of multi-segment coverage, and a complete off-chip boot code cannot be kept in the secure zone. After the signature verification succeeds, code execution is started after jumping to a start address of the off-chip boot.

The BSBC performs, in segments, copying and signature verification on the off-chip boot. Usually, a channel rate of a local bus (localbus) in which the copying is performed is low, and time of copying and signature verification that are in segments and are for a 10 MB off-chip boot is estimated to be 2 s. After the signature verification succeeds, code execution is directly started after jumping to the start address of the off-chip boot. Because the off-chip boot is a non-secure zone, a secure boot process can be cracked by tampering with the off-chip boot code in the 2s time window Therefore, a system security vulnerability exists.

SUMMARY

Embodiments of the present invention provide a secure boot and apparatus, and a terminal device, so that in a common secure boot process, a security vulnerability in a specific time window can be prevented, and system security can be improved.

The embodiments of the present invention may be specifically implemented by using the following technical solutions:

According to a first aspect, an embodiment of the present invention provides a secure boot method. The method includes: copying code of a first off-chip boot and a security signature of the first off-chip boot to a static random access memory SRAM for signature verification, where a function implemented by the first off-chip boot includes initializing a double data rate synchronous dynamic random access memory DDR, and the process of initializing a DDR includes configuring a DDR secure zone; executing, in the SRAM, the code of the first off-chip boot after the signature verification on the first off-chip boot succeeds, to initialize the DDR and configure the DDR secure zone; copying code of a second off-chip boot and a security signature of the second off-chip boot to the DDR secure zone for signature verification, where the second off-chip boot is all of other boots in off-chip boots except the first off-chip boot; and executing, in the DDR secure zone, the code of the second off-chip boot after the signature verification on the second off-chip boot succeeds. In this embodiment of the present invention, the first off-chip boot is added, and in the SRAM, after the signature verification on the first off-chip boot succeeds, the code of the first off-chip boot is executed to initialize the DDR and configure the DDR secure zone. Further, signature verification and code execution processes of all of other off-chip boots (that is, the second off-chip boot in this embodiment of the present invention) except the first off-chip boot are performed in the DDR secure zone. Therefore, in the prior art, a risk of tampering with code is avoided during code execution, after signature verification is performed in an SRAM secure zone, performed after jumping to a flash that is of a non-secure zone, and security of a system boot process is improved.

In a possible design, the first off-chip boat is a level of boot newly added to the off-chip boots. In this embodiment of the present invention, the newly-added level of boot is specially used to initialize the DDR and configure the DDR secure zone. Therefore, after the signature verification on the first off-chip boot succeeds, a DDR secure zone with a relatively large capacity is configured, to verify the second off-chip boot and execute the code of the second off-chip boot. In this way, a one-off copy and verification of the second off-chip boot are implemented, and this resolves a security vulnerability that an off-chip boot (in the non-secure zone) may be tampered with in a time window (about 2 s) of signature verification and jumping to the off-chip boot for execution.

In a possible design, a capacity of the first off-chip boot is smaller than or equal to a capacity of the SRAM, in this embodiment of the present invention, because the first off-chip boot has a single function, a size of the first off-chip boot can be smaller than 128 KB (or 256 KB), and an on-chip boot can copy the first off-chip boot at a time, thereby resolving the security vulnerability that the off-chip boot (in the non-secure zone) may be tampered with in a time window (about 2 s) of signature verification and jumping to the off-chip boot for execution.

According to a second aspect, an embodiment of the present invention provides a secure boot apparatus. The apparatus includes modules or units configured to perform the secure boot method described in the first aspect.

According to a third aspect, an embodiment of the present invention provides a terminal device. The terminal device includes a processor and a memory. The processor is configured to invoke a secure boot program instruction stored in the memory, to perform the secure boot method provided in the first aspect.

According to a fourth aspect, an embodiment of the present invention provides a computer storage medium, configured to store a computer software program instruction used to perform the secure boot method according to the first aspect. When the program instruction is executed by a processor, the processor performs the secure boot method according to the first aspect.

According to a fifth aspect, an embodiment of the present invention provides a computer program. The program includes a computer software program instruction, and when the program instruction is executed by a processor, the processor performs the secure boot method according to the first aspect.

DESCRIPTION OF EMBODIMENTS

To make the technical solutions and beneficial effects of the present invention clearer, the following further describes the present invention in detail with reference to the accompanying drawings and embodiments.

The secure boot method in the embodiments of the present invention is applicable to various terminal devices with a processor (Central Processing Unit, CPU for short), including a server, a computing device, a vehicle-mounted device, a wearable device, and various forms of user equipment (User Equipment, UE), a mobile station (Mobile station, MS), a terminal (terminal), a terminal device (Terminal Equipment), an embedded device (for example, an embedded board in a base station device), and the like. The CPU may be an ARM CPU or a CPU of another type. This is not specifically limited in the embodiments of the present invention.

The embodiments of the present invention are applicable to a secure boot scenario, for example, a system secure boot of an ARM architecture. In this embodiment of the present invention, the system secure boot is used as an example for description.

Figure 1:
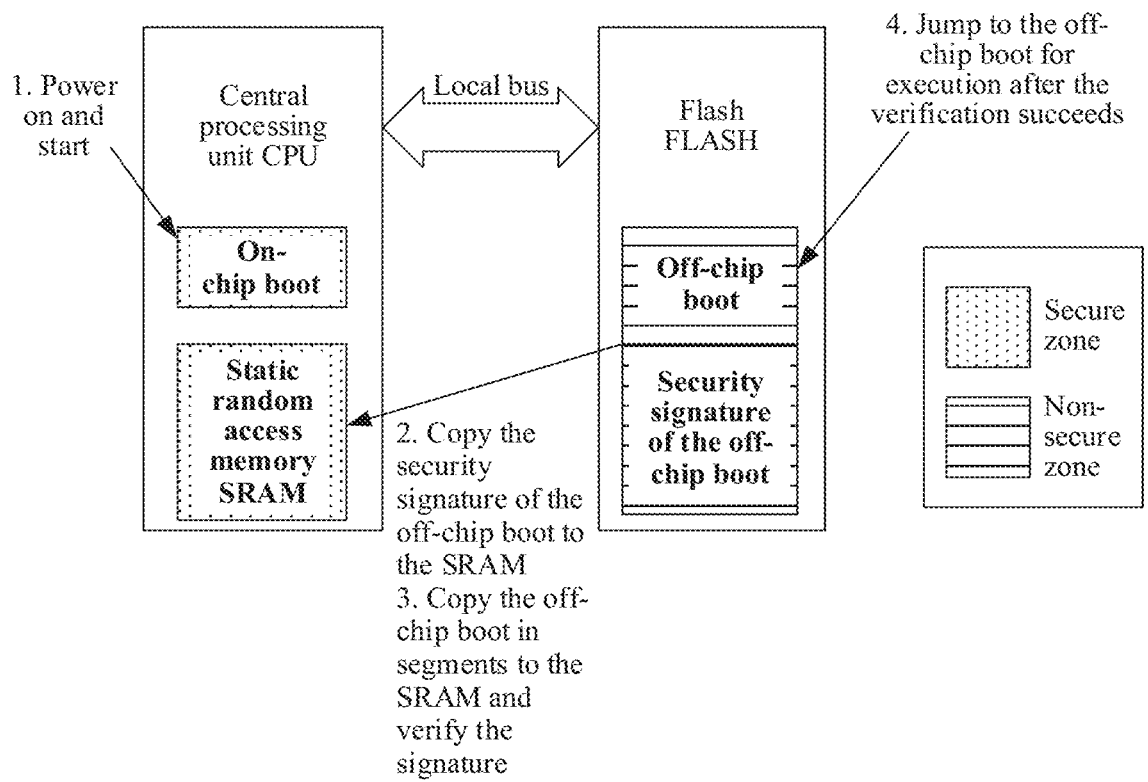
FIG. 1 is a schematic diagram of a secure boot process in the prior art.
Figure 2:
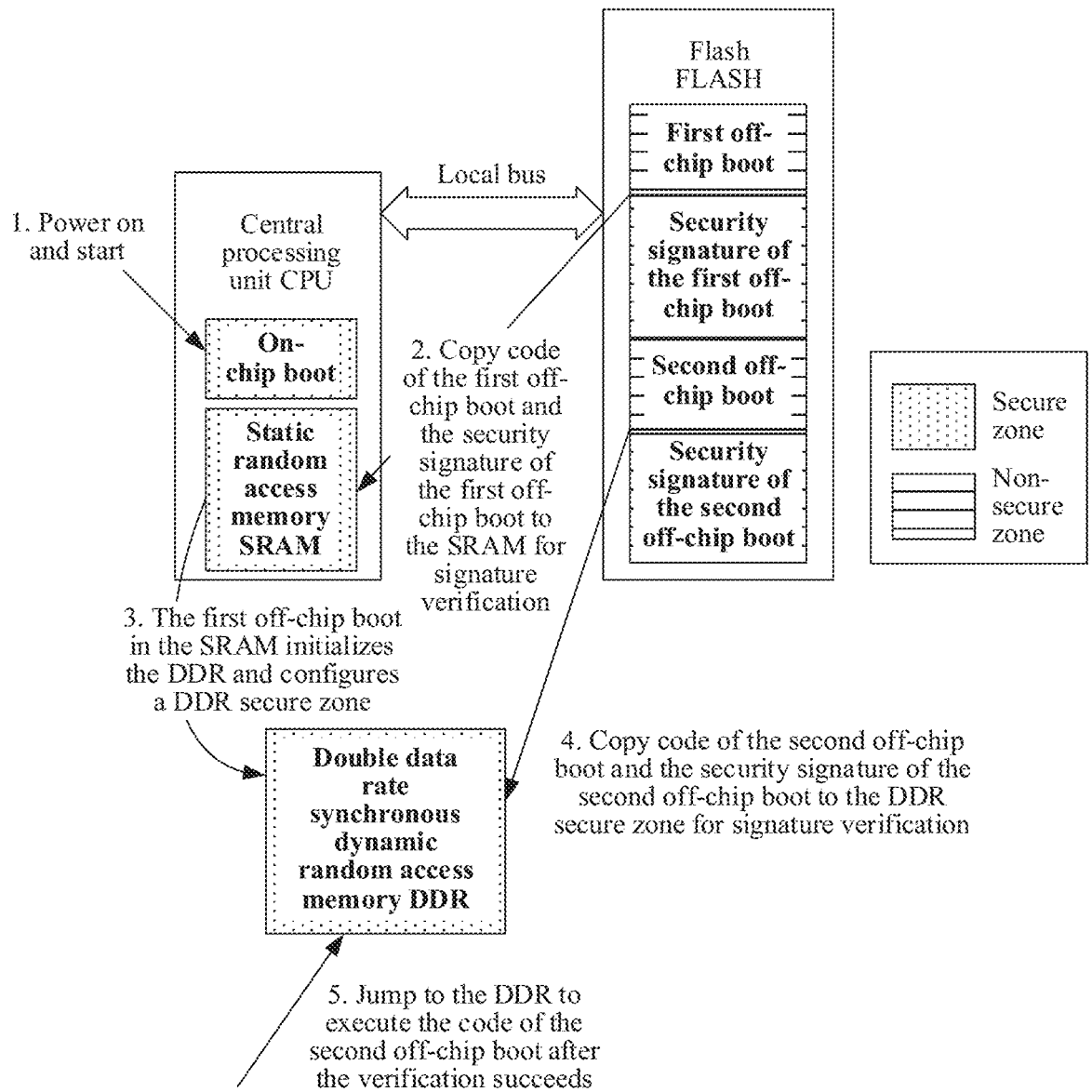
FIG. 2 is a schematic flowchart of a secure boot method according to an embodiment of the present invention.

FIG. 2 is a schematic flowchart of a secure boot method according to an embodiment of the present invention. The method is performed by a processor (CPU).

Step 1: Power on and start a system.

After the system is powered on, a BSBC is first run an on-chip boot program (Boot), and after necessary initialization configuration is completed, step 2 is performed.

Step 2: Copy code of a first off-chip boot and a security signature of the first off-chip boot to an SRAM for signature verification, and perform step 3 after the signature verification succeeds, where a function implemented by the first off-chip boot includes initializing a DDR, and the process of initializing a DDR includes configuring a DDR secure zone.

In this embodiment of the present invention, the code of the first off-chip boot and the security signature of the first off-chip boot may be copied to the SRAM at a time.

Figure 3:
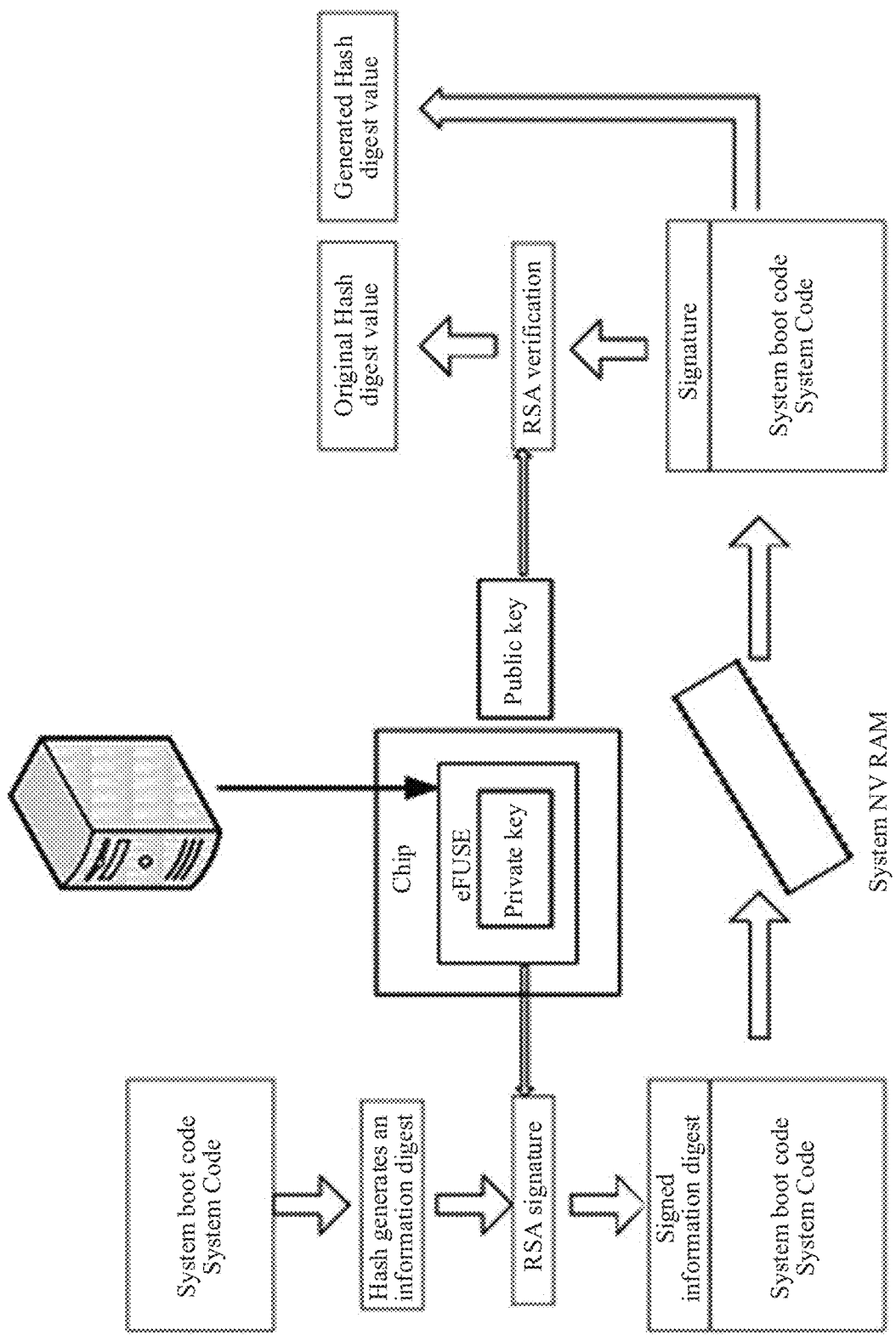
FIG. 3 is a schematic diagram of a signature verification process according to an embodiment of the present invention.

For a specific signature verification process, refer to FIG. 3. The signature verification is performed on the code of the first off-chip boot by using the security signature of the first off-chip boot, to verify whether the code of the first off-Chip boot is tampered with.

It should be noted that, the first off-chip boot in this embodiment of the present invention is a level of boot newly added to off-chip hoots. A function of the newly added off-chip boot is mainly to complete initialization of the DDR (initialization of existing hardware on a device), and the process of initializing the DDR includes a process of configuring the DDR secure zone. In the process of initializing the DDR, another process different from the process of configuring the DDR secure zone is the prior art, which is not specially described in this embodiment of the present invention. The process of configuring the DDR secure zone may include but is not limited to the following process: specifying that a segment of address interval is secure, and accessing the segment of address interval only in a particular secure access manner, instead of accessing in a non-secure access manner and configuring a capacity of the DDR secure zone. A DDR zone is secure because code in the DDR is not easily tampered with by a third party by using software, and therefore is securer than an off-chip memory (such as a flash).

In this embodiment of the present invention, because the first off-chip boot has a single function, a size of the first off-chip boot can be smaller than 128 KB (or 256 KB), and an on-chip boot can copy the first off-chip boot at a time, thereby resolving a security vulnerability that an off-chip boot (in a non-secure zone) may be tampered with in a time window (about 2 s) of signature verification and jumping to the off-chip boot for execution.

Step 3: Execute, in the SRAM, the code of the first off-chip boot, to initialize the DDR and configure the DDR secure zone.

In a common computer system, a capacity of an SRAM is relatively small (generally 128 KB or 256 KB), and a capacity of a DDR space is relatively large (generally greater than 1 GB). Because the DDR space is large, in a subsequent secure boot process, other off-chip boots different from the first off-chip boot may be copied to the DDR secure zone at a time for execution, to resolve a time window security vulnerability, in the prior art, in a period of executing code by jumping to a non-secure flash space after segmented verification signatures are copied for a plurality of times.

Step 4: Copy code of a second off-chip boot and a security signature of the second off-chip boot to the DDR secure zone for signature verification, where the second off-chip boot is all of other boots in the off-chip boots except the first off-chip boot, and perform step 5 after the signature verification succeeds.

In this embodiment of the present invention, the code of the second off-chip boot and the security signature of the second off-chip boot may be copied to the DDR secure zone at a time.

For a specific signature verification process, refer to FIG. 3. The signature verification is performed on the code of the second off-chip boat by using the security signature of the second off-chip boot, to verify whether the code of the second off-chip boot is tampered with.

Step 5: Execute the code of the second off-chip boot in the DDR secure zone.

In this embodiment of the present invention, the signature verification and the code execution on the first off-chip boot and the second off-chip boot are both performed in the SRAM or the DDR secure zone, thereby improving security of a system boot process.

In this embodiment of the present invention, the first off-chip boot is added, and in the SRAM, after the signature verification on the first off-chip boot succeeds, the code of the first off-chip boot is executed to initialize the DDR and configure the DDR secure zone. Further, signature verification and code execution processes of all of other off-chip boots different from the first off-chip boot are performed in the DDR secure zone. Therefore, a risk that code is tampered with during code execution that is after signature verification is performed in an SRAM secure zone and that is performed by jumping to a flash of a non-secure zone in the prior art is avoided, thereby improving security of the system boat process.

With reference to FIG. 3, the following describes a signature verification process.

When system boot code (boot code corresponding to a version of the system, System Code) is being started, a signature security verification needs to be performed first, to ensure that the system boot code is not tampered with. FIG. 3 is a schematic diagram of a signature verification process related to a system secure boot. In the schematic diagram shown in FIG. 3, an eFuse module is used to store security-related content such as a key.

A principle of signature verification may be as follows: a trust chain for the secure boot is constructed by using an RSA-based asymmetric encryption algorithm, a private key signature, and a signature verification mechanism for public key verification.

A chip vendor randomly generates an asymmetric key pair, configures a public key Hash value and a private key index in an eFuse, and writes the public key to a specified location of the flash. An equipment vendor uses a one-way hash function: the Hash (Hash) function generates an information digest for system boot code, and then encrypts the information digest by using an eFuse private key, that is, a digital signature. The signed information digest and the system boot code are placed together and are written into an off-chip memory. The off-chip memory is usually a flash, for example, FIG. 2 shows a non-volatile random access memory (Non-Volatile Random Access Memory, NVRAM). A public and private key pair is generated inside a chip, and configuration and writing and verification processes are invisible and are not backed up.

During the secure boot, the system is started by an on-chip boot. An on-chip boot ROM includes minimum system initialization and a signature verification security verification program. A Hash value is first generated for the public key in the Flash, and is compared with a root of a trusted public key (Root Of Trust Public Key, ROTPK) of the eFuse. The root of the trusted public key is an SHA256 Hash value of an EK public key (N, e) used for the secure boot.

Therefore, it is ensured that the public key used for signature verification is uniquely specified. If the verification succeeds, a Hash digest value is generated for off-chip system boot code, and then an original Hash digest value is obtained by using the public key to verify the signature. By verifying the two information digest values, it can be known that whether the system boot code is tampered with and whether the system boot code is code expected to be authorized. After the signature verification on the off-chip system boot code succeeds, switch to the off-chip system start code execution, to guide a subsequent boot program.

The foregoing describes the version verification method in the embodiments of the present invention, and the following describes a secure boot apparatus in the embodiments of the present invention.

Figure 4:
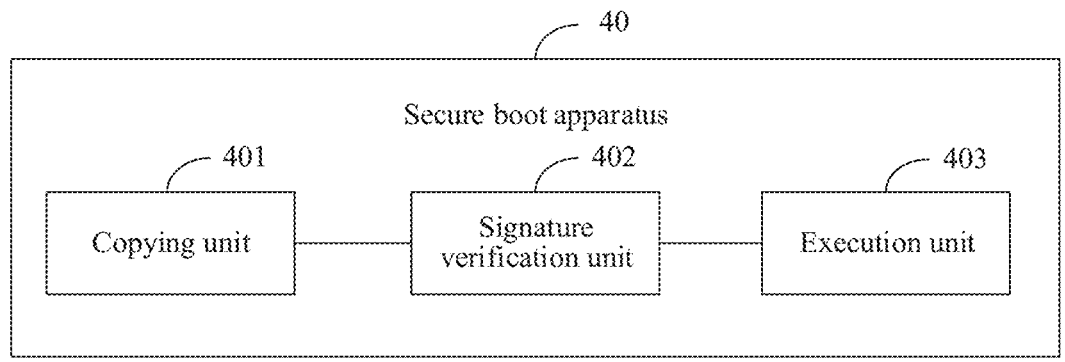
FIG. 4 is a schematic structural diagram of a secure boot apparatus according to an embodiment of the present invention.

FIG. 4 is a schematic structural diagram of a secure boot apparatus according to an embodiment of the present invention. As shown in FIG. 4, a secure boot apparatus 40 includes: a copying unit 401, a signature verification unit 402, and an execution unit 403.

In this embodiment of the present invention, the copying unit 401 is configured to copy code of a first off-chip boot and a security signature of the first off-chip boot to a static random access memory SRAM.

The signature verification unit 402 is configured to perform signature verification on the code of the first off-chip boot, where a function implemented by the first off-chip boot includes initializing a double data rate synchronous dynamic random access memory DDR, and the process of initializing a DDR includes configuring a DDR secure zone.

The execution unit 403 is configured to execute, in the SRAM, the code of the first off-chip boot after the signature verification unit 402 successfully performs the signature verification on the code of the first off-chip boot, to initialize the DDR and configure the DDR secure zone.

The copying unit 401 is further configured to copy code of a second off-chip boot and a security signature of the second off-chip boot to the DDR secure zone, where the second off-chip boot is all of other boots in off-chip boots except the first off-chip boot.

The signature verification unit 402 is further configured to perform signature verification on the code of the second off-chip boot.

The execution unit 403 is further configured to execute, in the DDR secure zone, the code of the second off-chip boot after the signature verification unit 402 successfully performs the signature verification on the code of the second off-chip boot.

Specifically, the first off-chip boot is a level of boot newly added to the off-chip boots.

Specifically, a capacity of the first off-chip boot is smaller than or equal to a capacity of the SRAM.

It should be noted that, for functions of the function modules in the secure boot apparatus 40 described in this embodiment of the present invention, refer to related descriptions in the embodiment shown in FIG. 2. Details are not described herein again.

In addition, an embodiment of the present invention further provides a chip. The chip is configured to execute program code, to perform all or some steps of the foregoing secure boot method embodiment.

In addition, an embodiment of the present invention further provides a terminal device. The terminal device may exist in a form of user equipment (for example, a mobile phone). The terminal device may further include a handheld device, a vehicle-mounted device, a wearable device, a computing device, and user equipment that is in various forms. The handheld device may be any terminal device, including a mobile phone, a tablet, a PDA (Personal Digital Assistant, Personal Digital Assistant), and the like.

Figure 5:
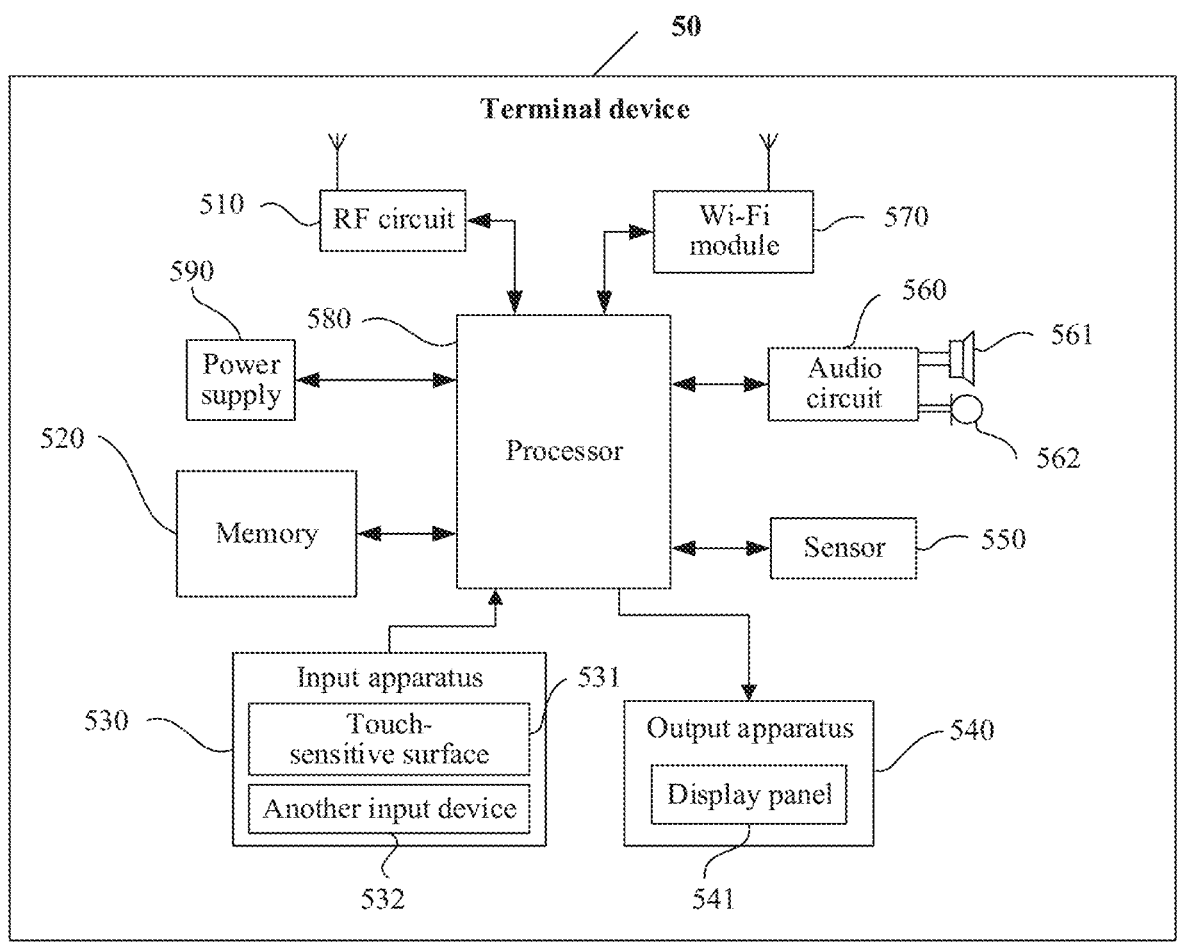
FIG. 5 is a schematic structural diagram of a terminal device according to an embodiment of the present invention.

FIG. 5 is a schematic structural diagram of a terminal device according to an embodiment of the present invention. Referring to FIG. 5, a terminal device 50 includes: components such as a radio frequency (Radio Frequency, RF) circuit 510, a memory 520, an input apparatus 530, an output apparatus 540, a sensor 550, an audio frequency circuit 560, a wireless fidelity (Wireless Fidelity, WiFi) module 570, a processor 580, and a power supply 590. The radio frequency circuit 510 and the WiFi module 570 are transceivers. A person skilled in the art may understand that a structure of the terminal device shown in FIG. 5 does not constitute a limitation on the terminal device, and the terminal device may include more or fewer components than those shown in the figure, or combine some components, or have different component arrangements.

The following specifically describes the components of the terminal device with reference to FIG. 5.

The memory 520 may be configured to store a software program and a module, and the processor 580 executes various functional applications of the terminal device 50 and data processing by running the software program and the module stored in the memory 520. The memory 520 mainly includes a program storage area and a data storage area. The program storage area may store an operating system, and an application program (for example, a sound play function and an image play function) required by at least one function; and the data storage area may store data (for example, audio data and a phone book) that is created based on use of the terminal device 50, and the like. In addition, the memory 520 may include a high-speed random access memory, and may further include a non-volatile memory, for example, at least one magnetic disk storage device, a flash storage device, or another volatile solid-state storage device.

Specifically, when the application program stored in the memory 520 is executed, some or all of the steps in the method corresponding to FIG. 2 are included. The memory 520 stores information such as a security signature of an off-chip boot and code of the off-chip boot.

The input apparatus 530 may be configured to receive input digit or character information, and generate key signal input related to user setting and function control of the terminal device 50. Specifically, the input apparatus 530 may include a touch control panel 531 and another input device 532. The touch control panel 531, also referred to as a touchscreen, may collect a touch operation (for example, an operation performed by a user on the touch control panel 531 or near the touch panel 531 by using any proper object or accessory such as a finger or a tablet pen) performed by the user on or near the touch control panel, and drive a corresponding connection apparatus based on a preset program. Optionally, the touch control panel 531 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, and converts the touch information into coordinates of a touch point. Then the touch controller sends the coordinates of the touch point to the processor 580, and can receive and execute a command sent by the processor 580. In addition, the touch control panel 531 may be implemented in a plurality of types, such as a resistive type, a capacitive type, an infrared type, and a surface acoustic wave type. In addition to the touch control panel 531, the input apparatus 530 may further include the another input device 532. Specifically, the another input device 532 may include but is not limited to one or more of a physical keyboard, a function key (for example, a volume control press key or a power on/off press key), a trackball, a mouse, a joystick, and the like.

The output apparatus 540 may be configured to display information input by a user or information provided for a user. The output apparatus 540 may include a display panel 541. Optionally, the display panel 541 may be configured in a form of a liquid crystal display (Liquid Crystal Display, LCD), an organic light-emitting diode (Organic Light-Emitting Diode, OLED), and the like. Further, the touch control panel 531 may cover the display panel 541. When detecting a touch operation on or near the touch control panel 531, the touch control panel 531 transmits the touch operation to the processor 580 to determine a type of a touch event. Then the processor 580 provides, based on the type of the touch event, corresponding visual output on the display panel 541. Although in FIG. 5, the touch control panel 531 and the display panel 541 are used as two independent components to implement input and output functions of the terminal device 50, in some embodiments, the touch control panel 531 and the display panel 541 may be integrated to implement the input and output functions of the terminal device 50.

The processor 580 is a control center of the terminal device 50, is connected to each part of the entire terminal device by using various interfaces and lines, and performs various functions of the terminal device 50 and data processing by running or executing a software program and/or a module that are/is stored in the memory 520 and by invoking data stored in the memory 520, to perform overall monitoring on the terminal device 50. Optionally, the processor 580 may include one or more processing units. Preferably, an application processor and a modem processor may be integrated in the processor 580. The application processor mainly processes an operating system, a user interface, an application program, and the like. The modem processor mainly processes wireless communication. It may be understood that the modem processor may alternatively not be integrated into the processor 580.

Specifically, the processor 580 in this embodiment of the present invention is configured to execute the application program in the memory 520, to perform some or all steps performed by the processor in the embodiment in FIG. 2.

The terminal device 50 may further include at least one sensor 550 and the power supply 590. Although not shown, the terminal device 50 may further include a camera, a Bluetooth module, and the like. Details are not described herein.

In addition, an embodiment of the present invention further provides a computer storage medium. The medium stores a computer software program instruction. When the computer software program instruction is executed by a processor, the processor performs some or all of the steps in the foregoing secure boot method.

Methods or algorithm steps described in combination with the content disclosed in this embodiment of the present invention may be implemented by hardware, or may be implemented by a processor by executing a software program instruction. The software program instruction may include a corresponding software module. The software module may be stored in a RAM, a flash memory, a ROM, an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and can write information into the storage medium. Certainly, the storage medium may be a component of the processor. The processor and the storage medium may be located in an ASIC. In addition, the ASIC may be located in the terminal device.

A person skilled in the art should be aware that in the foregoing one or more examples, functions described in the embodiments of the present invention may be implemented by hardware, software, firmware, or any combination thereof. When the functions are implemented by software, the functions may be stored in a computer-readable medium or transmitted as one or more program instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

In the foregoing specific implementations, the objectives, technical solutions, and beneficial effects of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on the technical solutions of the embodiments of the present invention shall fall within the protection scope of the embodiments of the present invention.

What is claimed is:

1. A secure boot method, comprising:
   copying code of a first off-chip boot and a security signature of the first off-chip boot to a static random access memory (SRAM) for signature verification, wherein a function implemented by the first off-chip boot comprises initializing a double data rate synchronous dynamic random access memory (DDR), and wherein initializing a DDR comprises configuring a DDR secure zone;
   after the signature verification on the first off-chip boot succeeds, executing, in the SRAM, the code of the first off-chip boot to initialize the DDR and configure the DDR secure zone;
   after executing, in the SRAM, the code of the first off-chip boot to initialize the DDR and configure the DDR secure zone, copying code of a second off-chip boot and a security signature of the second off-chip boot to the DDR secure zone for signature verification, wherein the second off-chip boot is all boots in off-chip boots except the first off-chip boot; and
   after the signature verification on the second off-chip boot succeeds, executing, in the DDR secure zone, the code of the second off-chip boot.

2. The method according to claim 1, wherein the first off-chip boot is a level of boot newly added to the off-chip boots.

3. The method according to claim 1, wherein a capacity of the first off-chip boot is smaller than or equal to a capacity of the SRAM.

4. A secure boot apparatus, comprising:
   at least one processor; and
   a non-transitory computer-readable storage medium coupled to the at least one processor and storing programming instructions for execution by the at least one processor, wherein, when executed by the at least one processor, the programming instructions instruct the at least one processor to:
   copy code of a first off-chip boot and a security signature of the first off-chip boot to a static random access memory (SRAM);
   perform signature verification on the code of the first off-chip boot, wherein a function implemented by the first off-chip boot comprises initializing a double data rate synchronous dynamic random access memory (DDR), and wherein initializing a DDR comprises configuring a DDR secure zone;
   after successfully performing the signature verification on the code of the first off-chip boot, execute, in the SRAM, the code of the first off-chip boot to initialize the DDR and configure the DDR secure zone;
   after executing, in the SRAM, the code of the first off-chip boot to initialize the DDR and configure the DDR secure zone, copy code of a second off-chip boot and a security signature of the second off-chip boot to the DDR secure zone, wherein the second off-chip boot is all boots in off-chip boots except the first off-chip boot;
   perform signature verification on the code of the second off-chip boot; and
   after successfully performing the signature verification on the code of the second off-chip boot, execute, in the DDR secure zone, the code of the second off-chip boot.

5. The secure boot apparatus according to claim 4, wherein the first off-chip boot is a level of boot newly added to the off-chip boots.

6. The secure boot apparatus according to claim 4, wherein a capacity of the first off-chip boot is smaller than or equal to a capacity of the SRAM.

7. A terminal device, comprising:
   at least one processor; and
   a non-transitory computer-readable storage medium coupled to the at least one processor and storing programming instructions for execution by the at least one processor, wherein, when executed by the at least one processor, the programming instructions instruct the at least one processor to perform operations comprising:
   copying code of a first off-chip boot and a security signature of the first off-chip boot to a static random access memory (SRAM) for signature verification, wherein a function implemented by the first off-chip boot comprises initializing a double data rate synchronous dynamic random access memory (DDR), and wherein initializing a DDR comprises configuring a DDR secure zone;
   after the signature verification on the first off-chip boot succeeds, executing, in the SRAM, the code of the first off-chip boot to initialize the DDR and configure the DDR secure zone;
   after executing, in the SRAM, the code of the first off-chip boot to initialize the DDR and configure the DDR secure zone, copying code of a second off-chip boot and a security signature of the second off-chip boot to the DDR secure zone for signature verification, wherein the second off-chip boot is all boots in off-chip boots except the first off-chip boot; and after the signature verification on the second off-chip boot succeeds, executing, in the DDR secure zone, the code of the second off-chip boot.

8. The terminal device according to claim 7, wherein the first off-chip boot is a level of boot newly added to the off-chip boots.

9. The terminal device according to claim 7, wherein a capacity of the first off-chip boot is smaller than or equal to a capacity of the SRAM.

* * * * *